(12) United States Patent
Chen et al.

(10) Patent No.: US 10,141,025 B2
(45) Date of Patent: Nov. 27, 2018

(54) METHOD, DEVICE AND COMPUTER-READABLE MEDIUM FOR ADJUSTING VIDEO PLAYING PROGRESS

(71) Applicant: Beijing Xiaomi Mobile Software Co., Ltd., Haidian District, Beijing (CN)

(72) Inventors: Zhijun Chen, Beijing (CN); Shaohua Wan, Beijing (CN); Song Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/452,224

(22) Filed: Mar. 7, 2017

(65) Prior Publication Data
US 2018/0151199 A1  May 31, 2018

(30) Foreign Application Priority Data
Nov. 29, 2016 (CN) .......................... 2016 1 1078225

(51) Int. Cl.
| | |
|---|---|
| G11B 27/10 | (2006.01) |
| G06F 17/30 | (2006.01) |
| G11B 27/32 | (2006.01) |
| G11B 27/34 | (2006.01) |
| G06K 9/00 | (2006.01) |
| H04N 9/87 | (2006.01) |

(52) U.S. Cl.
CPC ........ *G11B 27/102* (2013.01); *G06F 17/3082* (2013.01); *G06F 17/3084* (2013.01); *G06F 17/30672* (2013.01); *G06F 17/30828* (2013.01); *G06F 17/30846* (2013.01); *G06K 9/00744* (2013.01); *G11B 27/322* (2013.01); *G11B 27/34* (2013.01); *H04N 9/87* (2013.01)

(58) Field of Classification Search
CPC ............ G11B 27/102; G06F 17/30672; G06F 17/3082; H04N 9/87
See application file for complete search history.

(56) References Cited

U.S. PATENT DOCUMENTS

| | | |
|---|---|---|
| 4,823,306 A | 4/1989 | Barbic et al. |
| 8,443,279 B1 | 5/2013 | Hameed et al. |

(Continued)

OTHER PUBLICATIONS

Extended European Search Report issued in corresponding EP Application No. 17159424, dated Oct. 5, 2017, 8 pages.

(Continued)

*Primary Examiner* — Hung Q Dang
*Assistant Examiner* — Sunghyoun Park
(74) *Attorney, Agent, or Firm* — Arch Lake LLP

(57) ABSTRACT

A method, device and computer-readable medium are provided for adjusting video playing progress in the field of video processing. The method for adjusting video playing progress includes: acquiring a keyword inputted by a user; determining at least one matching keyframe corresponding to the keyword in a target video, which includes at least one keyframe; displaying the at least one matching keyframe; and adjusting displaying progress of the target video to target displaying progress, when a selection operation on a keyframe of the at least one matching keyframe is detected, where the target displaying progress corresponds to the keyframe as indicated by the selection operation.

15 Claims, 7 Drawing Sheets

(56) References Cited

U.S. PATENT DOCUMENTS

2003/0126603 A1* 7/2003 Kim ................. G06F 17/30017
                                                    725/38
2004/0111465 A1* 6/2004 Chuang ................. H04L 29/06
                                                    709/203
2005/0028194 A1* 2/2005 Elenbaas ........... G06F 17/30787
                                                    725/32
2008/0159383 A1   7/2008 Kukreja
2011/0047163 A1   2/2011 Chechik et al.
2011/0218997 A1   9/2011 Boiman et al.

OTHER PUBLICATIONS

Eurpoean Office Action for corresponding EP Patent Application No. 17159424.5 dated May 25, 2018, 7 pages.

* cited by examiner

METHOD, DEVICE AND COMPUTER-READABLE MEDIUM FOR ADJUSTING VIDEO PLAYING PROGRESS

CROSS-REFERENCE TO RELATED APPLICATION

This application is based on and claims priority to Chinese Patent Application No. 201611078225.4, filed on Nov. 29, 2016, the content of which is incorporated herein by reference in its entirety.

FIELD

The present disclosure relates to a field of video processing, and particularly, to a method, device and computer-readable medium for adjusting video playing progress.

BACKGROUND

With continuous developments of the Internet technology, a user may watch a lot of video files on the Internet. However, when watching a video, the user may want only to watch a certain section of the video. In this case, playing progress of the video should be adjusted in order to play the certain section of the video. During an adjustment of the playing progress, the user may browse video content by playing the video quickly, determine playing progress corresponding to the certain section of the video during the browsing, and then drag a playing progress bar of the video, so as to implement the adjustment of the video playing progress and play the certain section of the video. However, when adjusting the playing process, the user may need to determine the playing progress corresponding to the certain section of the video by browsing the video, which may take a lot of time and thus can reduce efficiency of the adjustment of the playing progress.

SUMMARY

In the present disclosure, a method, device and non-transitory computer-readable medium for adjusting video playing progress are provided.

According to a first aspect of embodiments of the disclosure, a method for adjusting video playing progress is provided. The method may include: acquiring a keyword inputted by a user; determining at least one matching keyframe corresponding to the keyword in a target video which includes at least one keyframe; displaying the at least one matching keyframe; and adjusting displaying progress of the target video to target displaying progress when a selection operation on a keyframe of the at least one matching keyframe is detected, wherein the target displaying progress corresponds to the keyframe as indicated by the selection operation.

According to a second aspect of embodiments of the disclosure, a device for adjusting video playing progress is provided. The device may include: a processor; and a memory for storing instructions executable by the processor. The processor is configured to: acquire a keyword inputted by a user; determine at least one matching keyframe corresponding to the keyword in a target video which includes at least one keyframe; display the at least one matching keyframe; and adjust displaying progress of the target video to target displaying progress, when a selection operation on a keyframe of the at least one matching keyframe is detected, wherein the target displaying progress corresponds to the keyframe as indicated by the selection operation.

According to a third aspect of embodiments of the disclosure, a non-transitory computer-readable storage medium having instructions stored thereon is provided. The instructions for adjusting video playing progress, when executed by a processor, may cause the processor to: acquire a keyword inputted by a user; determine at least one matching keyframe corresponding to the keyword in a target video which includes at least one keyframe; display the at least one matching keyframe; and adjust displaying progress of the target video to target displaying progress when a selection operation on a keyframe of the at least one matching keyframe is detected, wherein the target displaying progress corresponds to the keyframe as indicated by the selection operation.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Figure 1:
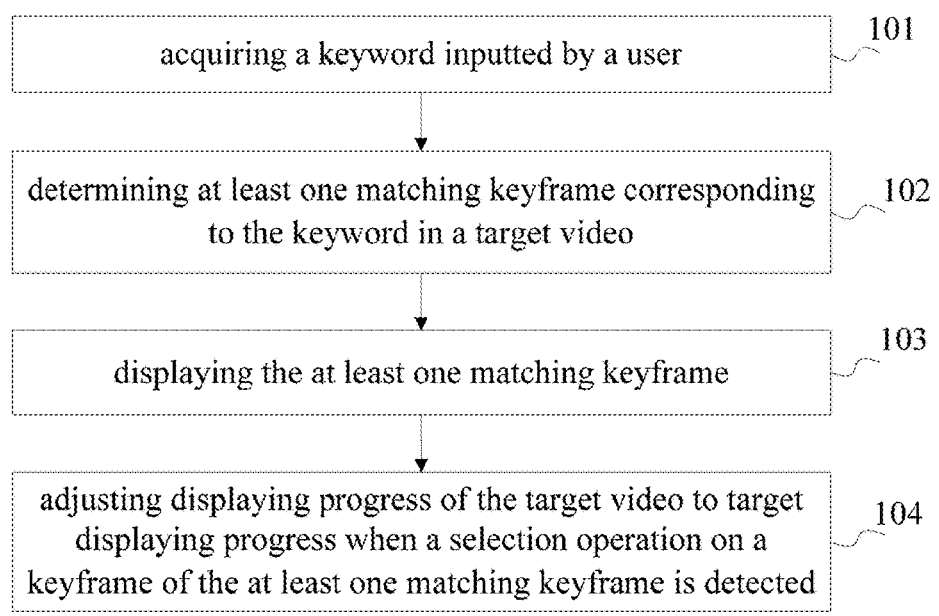
FIG. 1 is a flow diagram of a method for adjusting video playing progress illustrated according to an exemplary embodiment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of apparatus and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

FIG. 1 is a flow diagram of a method for adjusting video playing progress illustrated according to an exemplary embodiment. The method for adjusting video playing progress illustrated in FIG. 1 may be applied to a terminal. The method may include following steps.

In step 101, a keyword inputted by a user is acquired.

In step 102, at least one matching keyframe corresponding to the keyword inputted by the user is determined in a target video which includes at least one keyframe.

In step 103, the at least one matching keyframe is displayed.

In step 104, when a selection operation on a keyframe of the at least one matching keyframe is detected, displaying progress of the target video is adjusted to target displaying progress. The target displaying progress is the displaying progress corresponding to the keyframe as indicated by the selection operation.

In sum, the method for adjusting video playing progress provided by embodiments of the present disclosure includes following operations: obtaining, by a terminal, a keyword inputted by a user; determining at least one matching keyframe corresponding to the keyword in a target video; displaying the at least one matching keyframe; and adjusting displaying progress of the target video to target displaying progress, when a selection operation on a keyframe of the at least one matching keyframe is detected.

The method for adjusting video playing progress reduces time for adjusting video playing progress and improves efficiency of the adjustment of the playing progress, by determining, according to a keyword inputted by a user, one or more matching keyframes corresponding to the keyword and then adjusting the video playing progress according to a selection of different matching keyframes, a need that a user can only determine playing progress corresponding to a particular section of the video after browsing a target video is eliminated.

Figure 2:
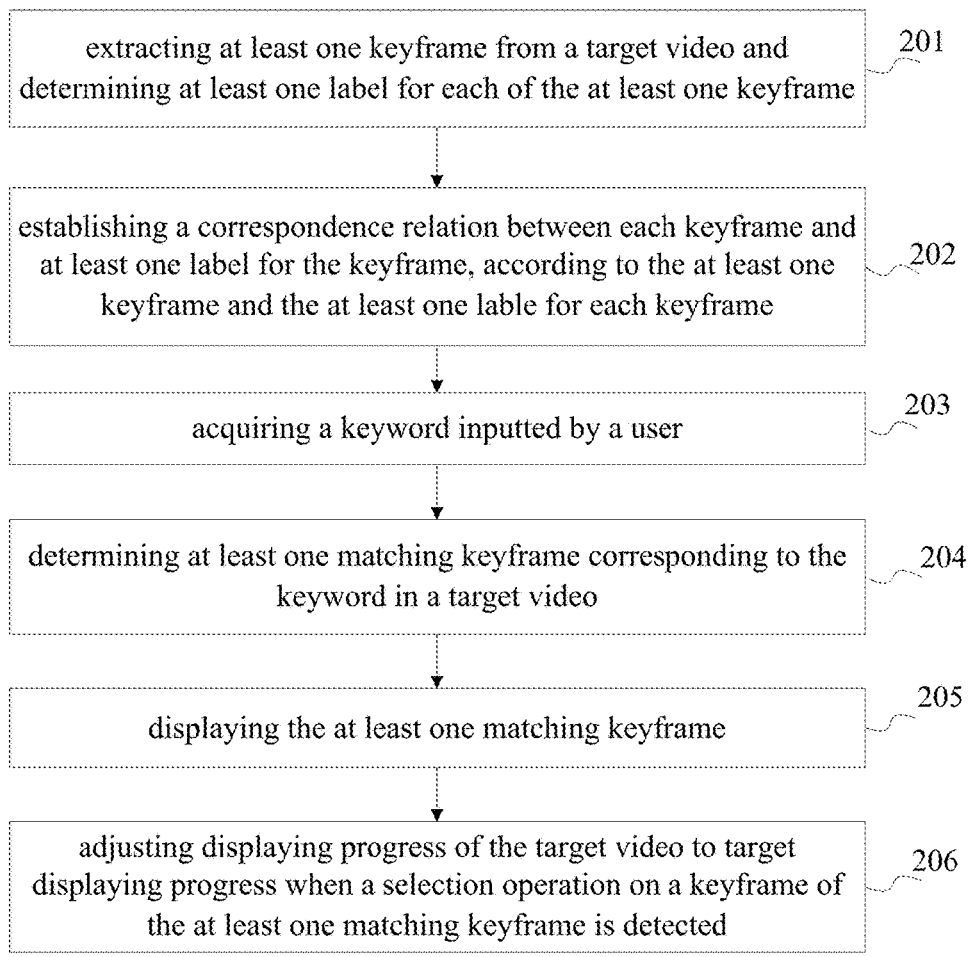
FIG. 2 is a flow diagram of a method for adjusting video playing progress illustrated according to an exemplary embodiment.

FIG. 2 is a flow diagram of a method for adjusting video playing progress according to an exemplary embodiment. The method shown in FIG. 2 for adjusting video playing progress may be applied to a terminal. The method may include following steps.

In step 201, at least one keyframe is extracted from a target video, and at least one label for each of the at least one keyframe may be determined.

The target video may include a plurality of frames, each of which corresponds to an image. The plurality of frames may include at least one keyframe. The at least one label for each of the at least one keyframe may be used to indicate content of the corresponding keyframe. Moreover, the target video may be any of video files in a server for providing a video file, including but not limiting to: a video which is being watched by a user or a video which the user is willing to watch.

For example, the terminal may extract the at least one keyframe from the target video by partitioning the target video into multiple shots, choosing a keyframe in each of the shots by a frame averaging method or histogram averaging method, and then determine the keyframe for each of the shots.

Further, the terminal may determine at least one label for each keyframe upon the extraction of the keyframe. During the determination of the label, the terminal may detect whether each of the at least one keyframe includes content within a set of target content. The set of target content may include at least one of object content, word content, word content and scene content. When any of the at least one keyframe includes certain content within the set of target content, the terminal may generate a label indicating the certain content for the keyframe. The set of target content may be set by the user via a terminal or may be determined according to historical watch pattern of the user or any other patterns determined by a processor. For example, the terminal may use a name of an object, a name of a character, literal information or scene information in the keyframe as the label for the keyframe.

Figure 3:
FIG. 3 is a schematic diagram of a keyframe illustrated according to an exemplary embodiment.

Referring to FIG. 3, a keyframe X as shown in FIG. 3 includes three characters and an indoor scene. As illustrated in Table 1, the terminal cannot determine the name of the character on the right side of FIG. 3, and thus may determine the character as a stranger and no label is generated for the character. When characters in the middle and on the left may be determined, correspondingly, labels for the keyframe X may be generated and may include names of the characters such as Tom and Jerry. A scene label for a name of the scene may be generated that corresponds to the keyframe X such as indoor.

TABLE 1

| Keyframe | Character Label | Object Label | Literal Label | Scene Label |
|---|---|---|---|---|
| X | Tom, Jerry | | | Indoor |

It is to be noted that: the terminal may acquire an object and the object's name in a keyframe using a method for image classification or object detection. The terminal may acquire literal information in the frame using the Optical Character Recognition (OCR) technology. The terminal may access prestored pictures of a plurality of characters, and match a character in the keyframe with the prestored pictures, and acquire a label of the character based on a result of the matching. The terminal may further identify a scene and acquire a label of the scene.

It is to be noted that, when the terminal determines the label for a keyframe, a plurality of labels may be obtained and the number of the labels may exceed a predetermined label number threshold, the terminal may screen the plurality of labels to determine and select one or more labels for the keyframe. The predetermined label number threshold may be determined based on the number of labels of each keyframe, which is not elaborated in the embodiments.

For example, the terminal may collect every label of every keyframe in a set of labels and determine the number of occurrences for each label in the set of labels. The terminal may then determine, for a keyframe having an inordinate number of labels, the number of occurrences for each corresponding label, and delete a label having the maximum number of occurrences. If the number of labels corresponding to the keyframe is still greater than the predetermined label number threshold, the terminal may continue to delete a label having the maximum number of occurrences from the labels corresponding to the keyframe until the number of labels corresponding to the keyframe is not greater than the predetermined label number threshold.

The predetermined label number threshold may also be determined and set by the user. For example, the user may set the predetermined label number threshold as a number for each keyframe in the video. When the predetermined label number threshold is set, one or more labels may be deleted when the number of labels for the keyframe exceeds the predetermined label number threshold.

Sometimes, an additional label threshold may be set for the keyframes in the video. For example, the label threshold may be a label percentage, and when the labels are generated for all keyframes in the video, the label percentage is 100%, when no label is generated for any keyframes in the video, the label percentage is 0%. Thus, when the label percentage is below the label threshold, 85% for example, an alert may be generated and is presented to the user via the terminal. By such way, the user may be alerted for abnormal label generation for keyframes, In step 202, according to the at least one keyframe and at least one label for each keyframe, a relationship between the least one label for each keyframe and the corresponding keyframe is established.

After determining the least one label for each keyframe, the terminal may establish the relationship between the least one label for each keyframe and the corresponding keyframe, according to each keyframe in the target video and the at least one label for each keyframe. Correspondingly, the relationship records each keyframe included in the target video and at least one label corresponding to each keyframe. In a subsequent step, content of a keyframe may be determined by inquiring a corresponding label.

For example, the relationship between the least one label for each keyframe and the corresponding keyframe may be described in reference to Table 2. As shown in Table 2, the relationship includes several keyframes and multiple labels corresponding to each keyframe.

TABLE 2

| Keyframe | Character Label | Object Label | Literal Label | Scene Label |
|---|---|---|---|---|
| X | Tom, Jerry | | | Indoor |
| . | . | . | . | . |
| . | . | . | . | . |
| . | . | . | . | . |
| Y | Tom | Firearms | | Forest |

In step 203, a keyword inputted by a user is acquired. The keyword may include at least one keyword component. That is to say, the user may input one keyword component or a set of keyword components, which is not limited in the embodiments.

Figure 4:
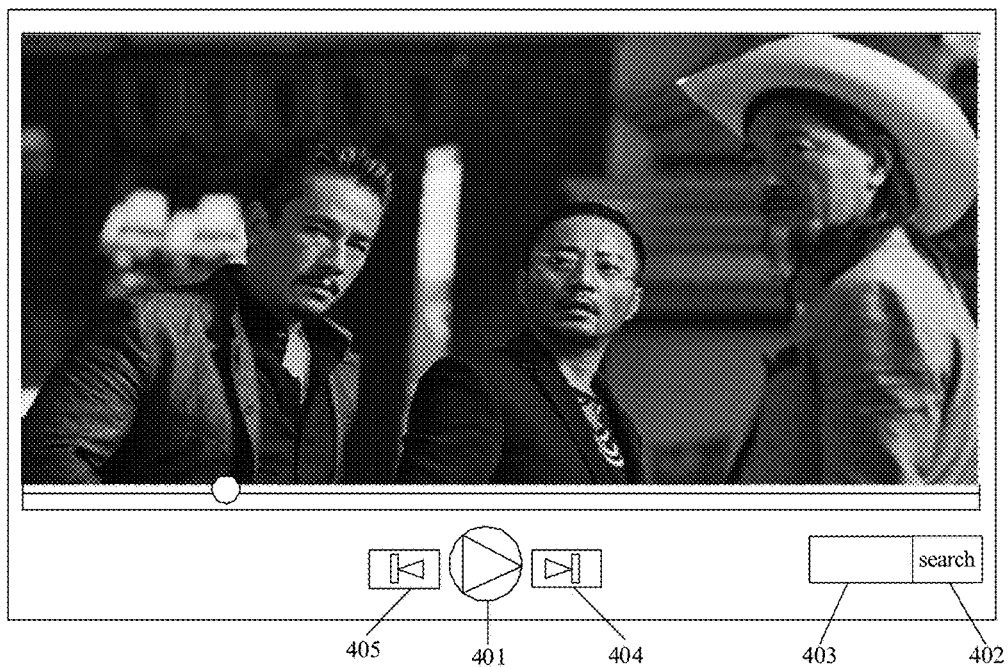
FIG. 4 is a schematic diagram of a playing interface provided by a terminal when a target video is being played illustrated according to an exemplary embodiment.

With reference to FIG. 4, the terminal may provide the user with a playing interface for playing the target video, during the playback of the target video. The playing interface may include a playback option 401, a search option 402, a search bar 403, a fast forward option 404 and fast backward option 405.

While watching the target video, if the user is willing to watch a certain section of the target video, she/he may input a keyword of the section in the search bar 403 provided by the terminal. When detecting the user's selection operation on the search option 402, the terminal may acquire the keyword inputted by the user and search according to the keyword, so as to acquire the certain section of the video that the user is willing to watch in a subsequent step.

Sometimes, the user may input a keyword before watching the target video.

Figure 5:
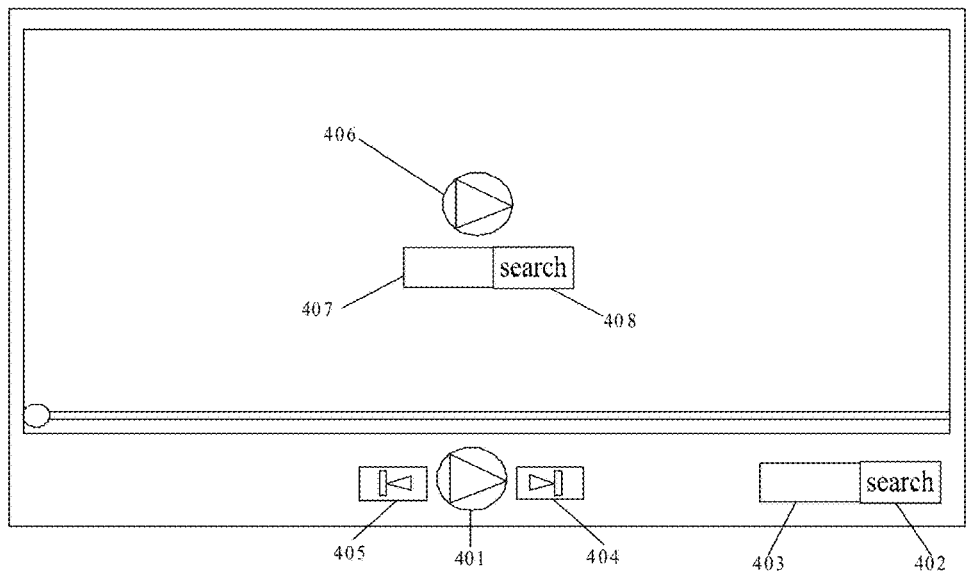
FIG. 5 is a schematic diagram of a playing interface provided by a terminal when a target video is not played illustrated according to an exemplary embodiment.

Referring to FIG. 5, the terminal may provide a playing interface as shown in FIG. 5, before the target video is played back. The playing interface may provide the user with an initial playback option 406, an initial search bar 407 and an initial search option 408. The user may input a keyword in the initial search bar 407 and click the initial search option 408, such that the terminal may acquire the keyword input by the user.

In step 204, at least one matching keyframe corresponding to the keyword is determined in the target video. The matching keyframe may be used to represent a keyframe matched the keyword in the at least one keyframe of the target video.

The terminal may acquire a keyword inputted by a user and inquires a relationship between a keyframe and a preset label according to the keyword. The terminal matches the keyword with each label recorded in the relationship and determines a label having a preset association with the keyword as a target label, so as to obtain at least one target label matching the keyword. The terminal then determine the at least one keyframe corresponding to the at least one target label in the relationship as the at least one matching keyframe corresponding to the keyword.

The target label is a label matching the keyword. In order to determine the match, the keyword may include at least one word of a label or may be the same as a label. For example, when the keyword inputted by the user is "notebook" and the at least one labels in the preset relationship includes "note", "book", "notebook" and "mouse", since "note" and "book" have at least one word which is the same as at least one word of "notebook" and the keyword "notebook" is the same as the "notebook" in the preset relationship, the labels "note", "book" and "notebook" may be determined as labels having a preset association with the keyword, i.e., the labels "note", "book" and "notebook" are target labels matching the keyword "notebook".

The preset matching degree threshold may be determined based on a matching degree between each label and the keyword.

Since the keyword may include at least one keyword component, after acquiring the keyword, the terminal may extend each keyword component of the keyword to obtain at least one extended word for the keyword component. For example, the terminal may extend the keyword "notebook" to keyword components "note" and "book." The terminal may then calculate a matching degree between each label and each of the at least one extended word respectively, and calculate the matching degree between each label recorded in the relationship and the keyword, according to the matching degree between each label and each of the at least one extended word.

It is to be noted that the matching degree between each label and the keyword may equal to a sum of the matching degree between the label and each of the at least one extended word, or an average of the matching degree between the label and each of the at least one extended word, or a maximum value of the matching degree between the label and each of the at least one extended word.

The matching degree between each label and the keyword may be determined by other ways, which shall not limited in the embodiments. For example, the terminal may calculate a matching degree between any label and each keyword component while calculating the matching degree between any label and each keyword, and calculate several matching degrees with different weights to obtain the matching degree between the keyword and each label.

Sometimes, the matching may be determined when the keyword partially matches the label. One example illustrated above is that the label contains one word included in the keyword. However, the matching may be determined when the keyword partially matches the label in other manners. For example, a matching may be determined when the label contains at least three (3) consecutive letters in the keyword. Or alternatively, a matching may be determined when the keyword contains at least three (3) consecutive letters in the label. Other partial matches may also be developed which is not elaborated herewith and should be considered as part of this disclosure.

In step 205, at least one matching keyframe is displayed.

After determining the at least one matching keyframe according the keyword inputted by the user, the terminal may sort the at least one matching keyframe based on a predetermined criterion, and then display the at least one matching keyframe according to the sorted order, for ease of watching the keyframe by the user.

For example, the terminal may sort the at least one matching keyframe based on a sequential order of the playing progress of the at least one matching keyframe in the target video, or sort the at least one matching keyframe based on a descending order of the matching degree of the keyword. The terminal may also sort the at least one matching keyframe based on other criterions, which are not limited in the embodiments.

Figure 6:
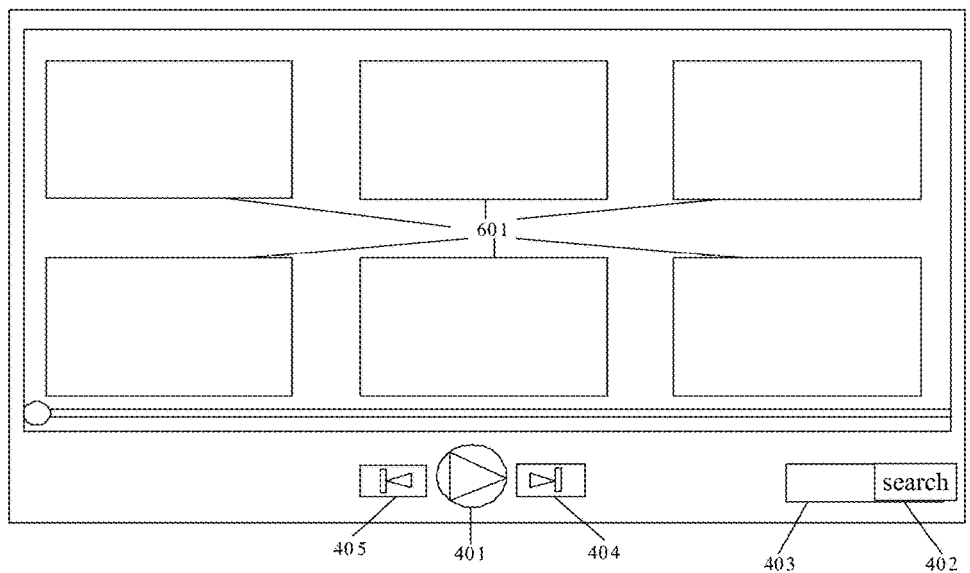
FIG. 6 is a schematic diagram for displaying at least one matching keyframe illustrated according to an exemplary embodiment.
Figure 7:
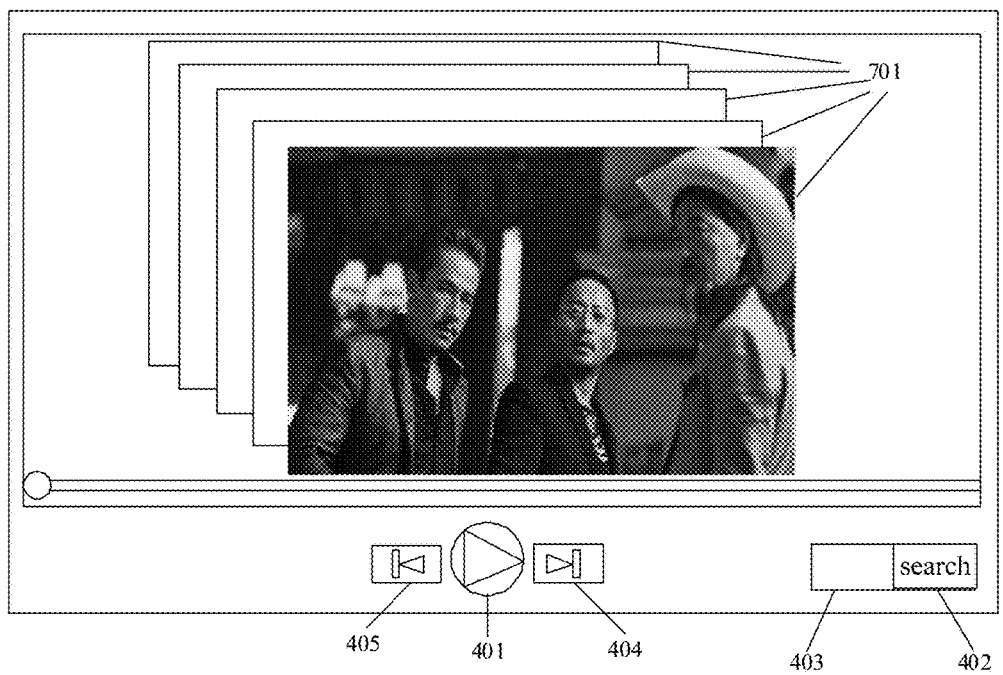
FIG. 7 is another schematic diagram for displaying at least one matching keyframe illustrated according to an exemplary embodiment.

The terminal may display the at least one matching keyframe in different patterns. For example, the terminal may display the at least one matching keyframe in a tiled pattern or an overlapped-combination pattern. Referring to FIG. 6, the terminal may tile each matching keyframe 601 in the playing interface as shown in FIG. 4, such that the user may directly watch each matching keyframe. Referring to FIG. 7, the terminal may combine the at least one matching keyframe in an overlapped way, and display the combined at least one matching keyframe in the playing interface as shown in FIG. 4, such that the user may watch an entire matching keyframe and other matching keyframes where most areas are sheltered. The user may watch each matching keyframe by dragging the one or more matching keyframes he or she would like.

In step 206, when a selection operation on a keyframe of the at least one matching keyframe is detected, displaying progress of the target video is adjusted to target displaying progress.

The target displaying progress is displaying progress corresponding to the keyframe as indicated by the selection operation.

The user may select a matching keyframe from the at least one matching keyframe with a selection operation, after seeing the at least one matching keyframe displayed on the terminal. When the terminal detects the selection operation on a certain keyframe, it may adjust the displaying progress of the target video to the target displaying progress, i.e., displaying progress corresponding to the selected matching keyframe.

It is to be noted that the terminal may adjust the displaying progress of the target video to the timing when a shot to which a certain keyframe belongs begins, such that the user may watch the video from the beginning part of the shot and thus may watch complete content of the shot.

For example, in the case that the timing corresponding to displaying progress of a certain keyframe is 24' 07", and time slot for playing a shot to which the keyframe belongs is 23' 36"-24' 19", the terminal may adjust the displaying progress to be 23' 36".

Additionally, the order of the steps of the method for adjusting video playing progress provided by embodiments of the disclosure may be adjusted appropriately, and steps may be added or deleted based on the circumstances. Any changes to the method as may be easily conceived by those skilled in the art within the technical scope disclosed by the invention should be considered as covered by the protection scope of the invention, and therefore are not detailed necessarily.

In conclusion, the method for adjusting video playing progress provided by embodiments of the present disclosure includes following operations: obtaining, by a terminal, a keyword inputted by a user; determining at least one matching keyframe corresponding to the keyword in a target video; displaying the at least one matching keyframe; and adjusting displaying progress of the target video to target displaying progress, when a selection operation on a keyframe of the at least one matching keyframe is detected.

The method for adjusting video playing progress reduces time for adjusting video playing progress and improves efficiency of the adjustment of the playing progress, by determining according to a keyword inputted by a user one or more matching keyframes corresponding to the keyword and then adjusting the video playing progress according to a selection of different matching keyframes, a need that a user can only determine playing progress corresponding to a particular section of the video after browsing a target video is eliminated.

Device embodiments of the disclosure are described below, which may be used to perform method embodiments of the disclosure. Please refer to the method embodiments of the disclosure for details which are not disclosed in the device embodiments of the disclosure.

Figure 8:
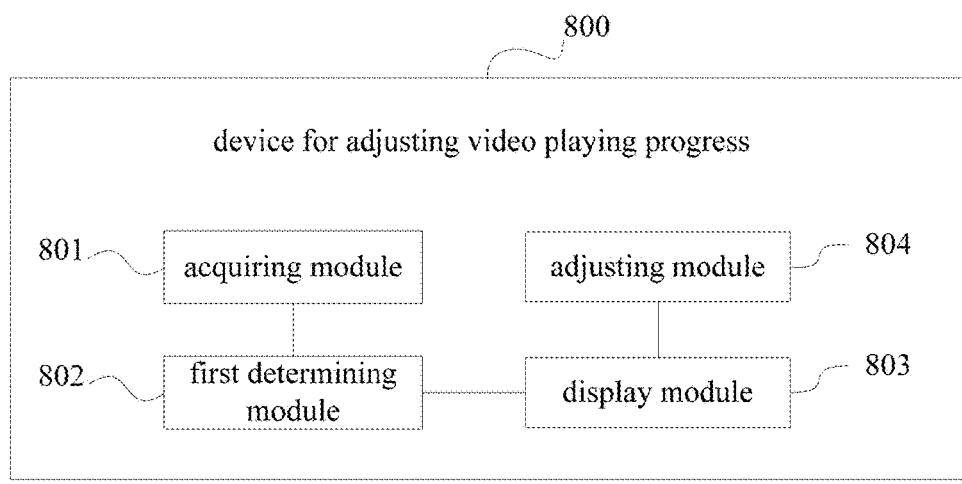
FIG. 8 is a block diagram of a device for adjusting video playing progress illustrated according to an exemplary embodiment.

FIG. 8 is a block diagram of a device for adjusting video playing progress illustrated according to an exemplary embodiment. As shown in FIG. 8, the device for adjusting video playing progress 800 may be used in a terminal. The device for adjusting video playing progress 800 may include an acquiring module 801, a first determining module 802, a display module 803 and an adjusting module 804.

The acquiring module 801 is configured to acquire a keyword inputted by a user.

The first determining module 802 is configured to determine at least one matching keyframe corresponding to the keyword in a target video which includes at least one keyframe.

The display module 803 is configured to display the at least one matching keyframe.

The adjusting module 804 is configured to adjust displaying progress of the target video to target displaying progress when a selection operation on a keyframe of the at least one matching keyframe is detected. The target displaying progress is displaying progress corresponding to the keyframe as indicated by the selection operation.

In conclusion, the device for adjusting video playing progress provided by embodiments of the present disclosure may be configured to perform following operations: obtaining, by a terminal, a keyword inputted by a user; determining at least one matching keyframe corresponding to the keyword in a target video; displaying the at least one matching keyframe; and adjusting displaying progress of the target video to target displaying progress, when a selection operation on a keyframe of the at least one matching keyframe is detected.

The device for adjusting video playing progress reduces time for adjusting video playing progress and improves efficiency of the adjustment of the playing progress, by determining according to a keyword inputted by a user one or more matching keyframes corresponding to the keyword and then adjusting the video playing progress according to a selection of different matching keyframes, a need that a user can only determine playing progress corresponding to a particular section of the video after browsing a target video is eliminated.

In an example, the first determining module 802 is further configured to inquire a relationship between a keyframe and a preset label according to the keyword, to obtain at least one target label matching the keyword, wherein the relationship records each keyframe included in the target video and at least one label corresponding to each keyframe, and the label of each keyframe indicates content of the keyframe; and determine the at least one keyframe corresponding to the at least one target label in the relationship as the at least one matching keyframe corresponding to the keyword.

The first determining module 802 may further be configured to calculate a matching degree between each label recorded in the relationship and the keyword; and determine the label having a matching degree greater than a preset matching degree threshold as the target label matching the keyword.

The keyword may include at least one keyword components. The first determining module 802 may further be configured to: extend each keyword component of the keyword to obtain at least one extended word for each keyword component; calculate a matching degree between each label and each of the at least one extended word respectively; and calculate the matching degree between each label recorded in the relationship and the keyword, according to the matching degree between each label and each of the at least one extended word.

The matching degree between each label and the keyword may be equal to a sum of the matching degree between the label and each of the at least one extended word. The matching degree between each label and the keyword may be equal to an average of the matching degree between the label and each of the at least one extended word. Alternative, the matching degree between each label and the keyword may be equal to a maximum value of the matching degree between the label and each of the at least one extended word.

In another example, the display module 803 is further configured to sort the at least one matching keyframe based on a sequential order of the playing progress of the at least one matching keyframe in the target video, and display sequentially the at least one matching keyframe according to the sorted order; or sort the at least one matching keyframe based on a descending order of the matching degree of the keyword, and display sequentially the at least one matching keyframe according to the sorted order.

The first determining module 802 may further be configured to match the keyword with each label recorded in the relationship respectively; determine the label having a preset association with the keyword as the target label matching the keyword. The preset association may include: the label includes at least one character, one word or any part of the keyword, or the keyword includes at least one character, one word or any part of the label, or the label is the same as the keyword.

Figure 9:
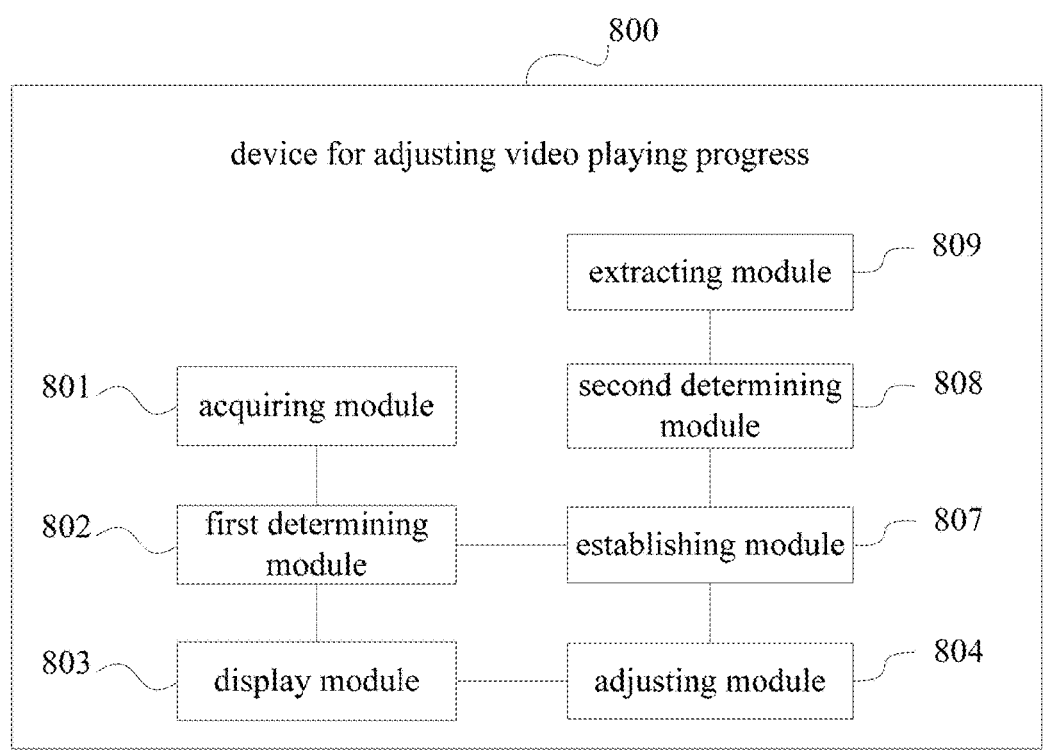
FIG. 9 is a block diagram of a device for adjusting video playing progress illustrated according to an exemplary embodiment.

In an embodiment, referring to FIG. 9, the device may further include an extracting module 805, a second determining module 806 and an establishing module 807.

The extracting module 805 may be configured to extract at least one keyframe from the target video.

The second determining module 806 may be configured to determine at least one label for each of the at least one keyframe.

The establishing module 807 may be configured to establish a relationship between each keyframe and the at least one label for the keyframe according to the at least one keyframe and the at least one label for each keyframe.

In an example, the second determining module 806 may further be configured to detect whether each of the at least one keyframe includes content within a set of target content including at least one of object content, character content, word content and scene content. The second determining module 806 may further be configured to generate a label indicating certain content within the set of target content for a keyframe when the keyframe includes the certain content.

Regarding the device provided in the above embodiments, particular ways for each of the modules of the device to perform a corresponding operation are described in details in the corresponding method embodiments, which will not be detailed herein.

A device for adjusting video playing progress is provided by an exemplary embodiment of the disclosure, which may implement the method for adjusting video playing progress provided by the disclosure. The device for adjusting video playing progress may include: a processor; and a memory for storing instructions executable by the processor. The processor is configured to: acquire a keyword inputted by a user; determine at least one matching keyframe corresponding to the keyword in a target video which includes at least one keyframe; display the at least one matching keyframe; and adjust displaying progress of the target video to target displaying progress, when a selection operation on a keyframe of the at least one matching keyframe is detected. The target displaying progress is displaying progress corresponding to the keyframe as indicated by the selection operation.

According to one aspect of embodiments of the disclosure, a device for adjusting video playing progress may be provided. The device may include: an acquiring module, configured to acquire a keyword inputted by a user; a first determining module, configured to determine at least one matching keyframe corresponding to the keyword in a target video which includes at least one keyframe; a display module, configured to display the at least one matching keyframe; and an adjusting module, configured to adjust displaying progress of the target video to target displaying progress when a selection operation on a keyframe of the at least one matching keyframe is detected, wherein the target displaying progress is displaying progress corresponding to the keyframe as indicated by the selection operation.

According to another aspect of embodiments of the disclosure, a non-transitory computer-readable storage medium having instructions stored thereon is provided. The instructions for adjusting video playing progress, when executed by a processor, may cause the processor to: acquire a keyword inputted by a user; determine at least one matching keyframe corresponding to the keyword in a target video which includes at least one keyframe; display the at least one matching keyframe; and adjust displaying progress of the target video to target displaying progress when a selection operation on a keyframe of the at least one matching keyframe is detected, wherein the target displaying progress corresponds to the keyframe as indicated by the selection operation.

Figure 10:
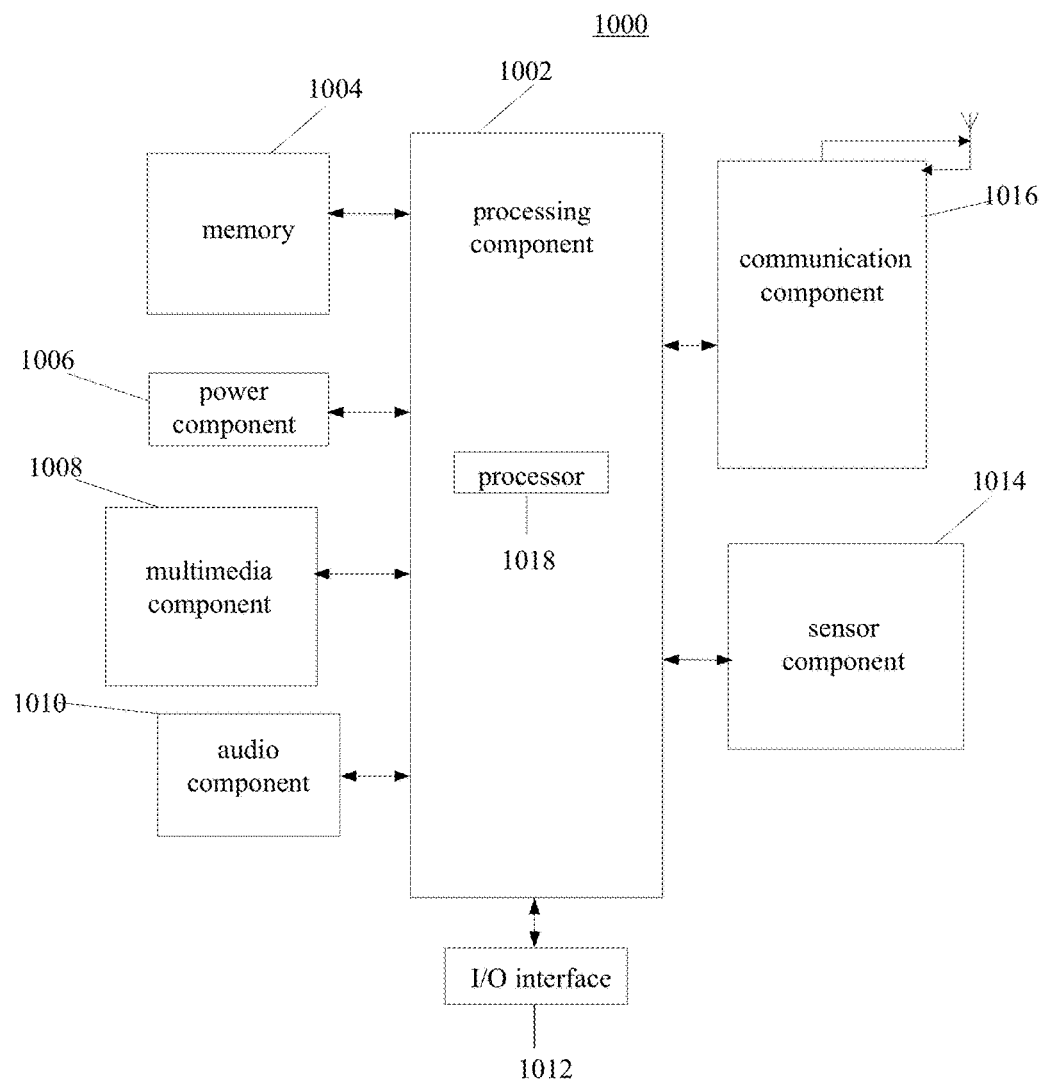
FIG. 10 is a block diagram of a device for adjusting video playing progress illustrated according to an exemplary embodiment.

FIG. 10 is a block diagram of a device for adjusting video playing progress illustrated according to an exemplary embodiment. For example, the device 1000 may be a mobile phone, a computer, a digital broadcast terminal, a messaging device, a gaming console, a tablet, a medical device, an exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1018 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 may be configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power for the device 1000.

The multimedia component 1008 may include a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have optical focusing and zooming capability.

The audio component 1010 may be configured to output and/or input audio signals. For example, the audio component 1010 includes a microphone (MIC) configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 may provide an interface between the processing component 1002 and peripheral interface modules, the peripheral interface modules being, for example, a keyboard, a click wheel, buttons, and the like. The buttons may include, but are not limited to, a home button, a volume button, a starting button, and a locking button.

The sensor component 1014 may include one or more sensors to provide status assessments of various aspects of the device 1000. For instance, the sensor component 1014 may detect an open/closed status of the device 1000, relative positioning of components (e.g., the display and the keypad of the device 1000), a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of a nearby object without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 may be configured to facilitate communication, wired or wirelessly, between the device 1000 and other devices. The device 1000 can access a wireless network based on a communication standard, such as WiFi, 2G or 3G; or a combination thereof. In an exemplary embodiment, the communication component 1016 receives a broadcast signal or broadcast associated information from an external broadcast management system via a broadcast channel. In an exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for adjusting video playing progress.

In exemplary embodiments, there is also provided a non-transitory computer-readable storage medium including instructions, such as included in the memory 1004, executable by the processor 1018 in the device 1000, for performing the above-described methods for adjusting video playing progress. For example, the non-transitory computer-readable storage medium may be a ROM, a random access memory (RAM), a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting video playing progress, comprising:
   acquiring a keyword inputted by a user;
   determining at least one matching keyframe corresponding to the keyword in a target video which includes at least one keyframe;
   displaying the at least one matching keyframe;
   adjusting displaying progress of the target video to target displaying progress when a selection operation on a keyframe of the at least one matching keyframe is detected, wherein the target displaying progress is displaying progress corresponding to the keyframe as indicated by the selection operation;
   extracting the at least one keyframe from the target video;
   determining at least one label for each of the at least one keyframe;
   establishing a correspondence relation between each keyframe and the at least one label for the keyframe according to the at least one keyframe and the at least one label for each keyframe; and
   determining occurrences of each label for the at least one keyframe and deleting a label when the occurrences are greater than a predetermined label number threshold.

2. The method of claim 1, wherein the determining at least one matching keyframe corresponding to the keyword in the target video comprises:
   inquiring a correspondence relation between a keyframe and a preset label according to the keyword, to obtain at least one target label matching the keyword, wherein the correspondence relation records each keyframe included in the target video and at least one label corresponding to each keyframe, and the label of each keyframe indicates content of the keyframe; and
   determining the at least one keyframe corresponding to the at least one target label in the correspondence relation as the at least one matching keyframe corresponding to the keyword.

3. The method of claim 2, wherein the inquiring the correspondence relation between the keyframe and the preset label according to the keyword, to obtain at least one target label matching the keyword comprises:
   calculating a matching degree between each label recorded in the correspondence relation and the keyword; and
   determining the label having a matching degree greater than a preset matching degree threshold as the target label matching the keyword.

4. The method of claim 3, wherein the keyword includes at least one keyword component;
   the calculating the matching degree between each label recorded in the correspondence relation and the keyword comprises:
   extending each keyword component of the keyword to obtain at least one extended word for the keyword component;
   calculating a matching degree between each label and each of the at least one extended word respectively; and
   calculating the matching degree between each label recorded in the correspondence relation and the keyword, according to the matching degree between each label and each of the at least one extended word;
wherein the matching degree between each label and the keyword is equal to a sum of the matching degree between the label and each of the at least one extended word; or
the matching degree between each label and the keyword is equal to an average of the matching degree between the label and each of the at least one extended word; or
the matching degree between each label and the keyword is equal to a maximum value of the matching degree between the label and each of the at least one extended word.

5. The method of claim 2, wherein the displaying the at least one matching keyframe comprises:
sorting the at least one matching keyframe based on a sequential order of the playing progress of the at least one matching keyframe in the target video, and displaying sequentially the at least one matching keyframe according to the sorted order; or
sorting the at least one matching keyframe based on a descending order of the matching degree of the keyword, and displaying sequentially the at least one matching keyframe according to the sorted order.

6. The method of claim 2, wherein the inquiring correspondence relation between the keyframe and the preset label according to the keyword, to obtain at least one target label matching the keyword comprises:
matching the keyword with each label recorded in the correspondence relation respectively;
determining the label having a preset association with the keyword as the target label matching the keyword, wherein the preset association includes that: the label includes at least one character of the keyword, or the keyword includes at least one character of the label, or the label is the same as the keyword.

7. The method of claim 1, wherein the determining at least one label for each of the at least one keyframe comprises:
detecting whether each of the at least one keyframe includes content within a set of target content, wherein the set of target content includes at least one of object content, character content, word content and scene content; and
generating a label indicating certain content within the set of target content for a keyframe when the keyframe includes the certain content.

8. A device for adjusting video playing progress, comprising:
a processor; and
a memory for storing instructions executable by the processor;
wherein the processor is configured to:
acquire a keyword inputted by a user;
determine at least one matching keyframe corresponding to the keyword in a target video which includes at least one keyframe;
display the at least one matching keyframe;
adjust displaying progress of the target video to target displaying progress when a selection operation on a keyframe of the at least one matching keyframe is detected, wherein the target displaying progress is displaying progress corresponding to the keyframe as indicated by the selection operation;
extract the at least one keyframe from the target video;
determine at least one label for each of the at least one keyframe;
establish a correspondence relation between each keyframe and the at least one label for the keyframe according to the at least one keyframe and the at least one label for each keyframe; and
determine occurrences of each label for the at least one keyframe and delete a label when the occurrences are greater than a predetermined label number threshold.

9. The device of claim 8, wherein the processor is further configured to:
inquire a correspondence relation between a keyframe and a preset label according to the keyword, to obtain at least one target label matching the keyword, wherein the correspondence relation records each keyframe included in the target video and at least one label corresponding to each keyframe, and the label of each keyframe indicates content of the keyframe; and
determine the at least one keyframe corresponding to the at least one target label in the correspondence relation as the at least one matching keyframe corresponding to the keyword.

10. The device of claim 9, wherein the processor is further configured to:
calculate a matching degree between each label recorded in the correspondence relation and the keyword; and
determine the label having a matching degree greater than a preset matching degree threshold as the target label matching the keyword.

11. The device of claim 10, wherein the keyword includes at least one keyword components;
the processor is further configured to:
extend each keyword component of the keyword to obtain at least one extended word for each keyword component;
calculate a matching degree between each label and each of the at least one extended word respectively; and
calculate the matching degree between each label recorded in the correspondence relation and the keyword, according to the matching degree between each label and each of the at least one extended word;
wherein the matching degree between each label and the keyword is equal to a sum of the matching degree between the label and each of the at least one extended word; or
the matching degree between each label and the keyword is equal to an average of the matching degree between the label and each of the at least one extended word; or
the matching degree between each label and the keyword is equal to a maximum value of the matching degree between the label and each of the at least one extended word.

12. The device of claim 9, wherein the processor is further configured to:
sort the at least one matching keyframe based on a sequential order of the playing progress of the at least one matching keyframe in the target video, and display sequentially the at least one matching keyframe according to the sorted order; or
sort the at least one matching keyframe based on a descending order of the matching degree of the keyword, and display sequentially the at least one matching keyframe according to the sorted order.

13. The device of claim 9, wherein the processor is further configured to:
match the keyword with teach label recorded in the correspondence relation respectively;

determine the label having a preset association with the keyword as the target label matching the keyword, wherein the preset association includes that: the label includes at least one character of the keyword, or the keyword includes at least one character of the label, or the label is the same as the keyword.

14. The device of claim 8, wherein the processor is further configured to:
   detect whether each of the at least one keyframe includes content within a set of target content, wherein the set of target content includes at least one of object content, character content, word content and scene content; and
   generate a label indicating certain content within the set of target content for a keyframe when the keyframe includes the certain content.

15. A non-transitory computer-readable storage medium having instructions stored thereon, the instructions, when executed by a processor, cause the processor to perform a method for adjusting video playing progress, the method comprising:
   acquiring a keyword inputted by a user;
   determining at least one matching keyframe corresponding to the keyword in a target video which includes at least one keyframe;
   displaying the at least one matching keyframe;
   adjusting displaying progress of the target video to target displaying progress, when a selection operation on a keyframe of the at least one matching keyframe is detected, wherein the target displaying progress is displaying progress corresponding to the keyframe as indicated by the selection operation;
   extracting the at least one keyframe from the target video;
   determining at least one label for each of the at least one keyframe;
   establishing a correspondence relation between each keyframe and the at least one label for the keyframe according to the at least one keyframe and the at least one label for each keyframe; and
   determining occurrences of each label for the at least one keyframe and deleting a label when the occurrences are greater than a predetermined label number threshold.

* * * * *